United States Patent [19]

Kirk

[11] Patent Number: 5,150,664
[45] Date of Patent: Sep. 29, 1992

[54] DISPENSING DEVICE

[75] Inventor: Christopher P. Kirk, Sunbury-on-Thames, United Kingdom

[73] Assignee: Pet Mate Limited, Shepperton, United Kingdom

[21] Appl. No.: 748,821

[22] Filed: Aug. 22, 1991

[30] Foreign Application Priority Data

Aug. 24, 1990 [GB] United Kingdom ............... 9018674

[51] Int. Cl.$^5$ .............................................. A01K 5/02
[52] U.S. Cl. .................................................. 119/51.12
[58] Field of Search ............... 119/51.11, 51.12, 51.13, 119/51.14, 51.15, 52.1, 56.1; 272/650

[56] References Cited

U.S. PATENT DOCUMENTS

| | | | |
|---|---|---|---|
| 3,826,231 | 7/1974 | Crawford | 119/51.12 |
| 3,900,007 | 8/1975 | Smith | 119/51.13 |
| 4,248,175 | 2/1981 | Navarro | 119/51.12 |
| 4,450,790 | 5/1984 | Stansbury, Jr. | 119/51.12 |
| 4,617,874 | 10/1986 | Zammaranu | 119/51.12 |
| 4,671,210 | 6/1987 | Robinson et al. | 119/51.12 |

Primary Examiner—Gene Mancene
Assistant Examiner—Thomas Price
Attorney, Agent, or Firm—Young & Thompson

[57] ABSTRACT

A device for dispensing e.g. food to domestic animals comprises a dish divided into sector-shaped compartments over which a removable cover rotates. The cover has an opening which registers with the compartments in sequence. The cover is rotated by a clock spring at intervals timed by a timer mechanism in turn driven by an electric motor. Cams of the timer mechanism sequentially displace one end of a cam follower or rocker lever so that its other end disengages a first abutment rotatable with the cover, permitting the spring to rotate the cover until a next abutment is engaged. The abutments opposed to the direction of rotation of the cover by the spring extend progressively further from the axis of rotation of the cover, or in an alternative arrangement are stepped in the direction of its rotational axis. Similarly the cams of the timer mechanism extend progressively further from its axis of rotation or are stepped in the direction of this axis. By disengaging the abutments successively the cam follower controls angular movement of the cover at time intervals determined by the circumferential separation of the cam surfaces. In a preferred construction this circumferential separation is adjustable as the cam surfaces are provided on respective time set levers which are manually adjustable about the axis of rotation of the timer device.

12 Claims, 7 Drawing Sheets

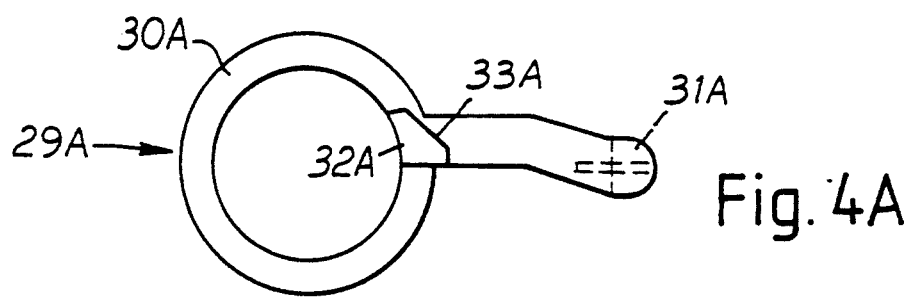
Fig. 4A
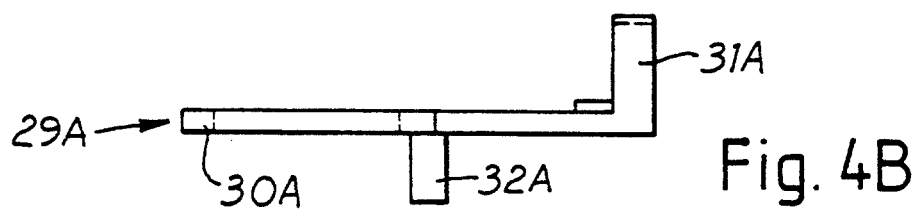
Fig. 4B
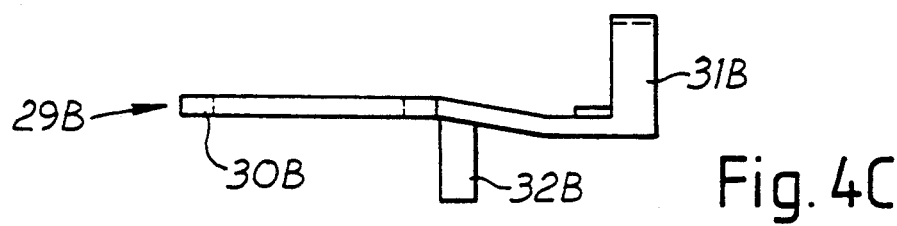
Fig. 4C
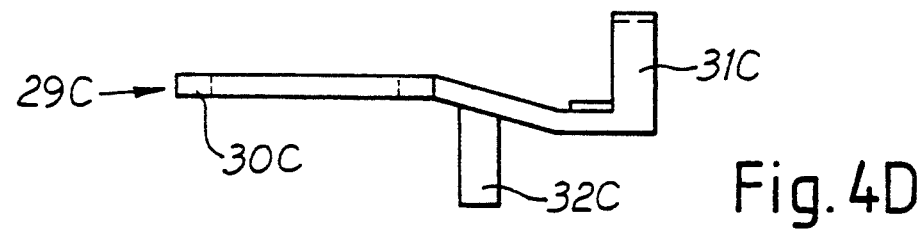
Fig. 4D
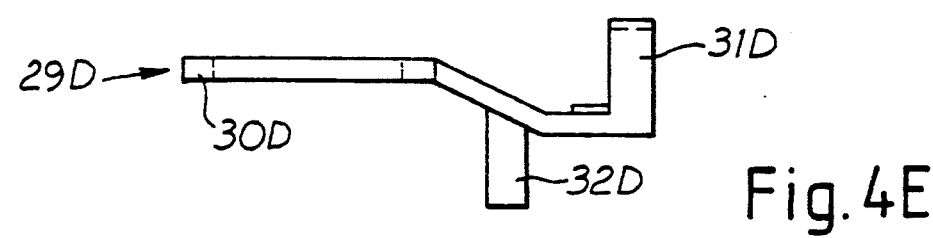
Fig. 4E
Fig. 4

5,150,664

DISPENSING DEVICE

FIELD OF THE INVENTION

This invention relates to a dispensing device particularly although not exclusively suitable for making available to domestic animals measured quantities of food or drink at predetermined time intervals.

OBJECTS OF THE INVENTION

Among the objects of the invention are to improve upon and simplify previous proposals and to provide at reduced cost a robust and reliable dispensing device capable of delivering relatively large quantities of comestibles at timed intervals.

It is a particular object of the invention to provide a dispensing device in which power for the dispensing means is independent of power for a timing mechanism which controls it. In this way a timing mechanism incorporating e.g. a battery-powered quartz chronometer can control the movement of a separately powered dispensing mechanism and operation of the dispensing mechanism per se will not place too high a requirement on the battery.

SUMMARY OF THE INVENTION

In accordance with the invention there is provided a dispensing device comprising a main element, means biasing the main element to tend to rotate in one sense about an axis of the main element, a control element, means for driving the control element in constant rotation about an axis of the control element, a series of abutments of the main element in an array stepped circumferentially about said axis thereof, a series of cam surfaces of the control element in an array stepped circumferentially about said axis thereof, a cam follower and means to maintain one end of the cam follower in contact with one of the array of abutments and its other end in contact with the array of cam surfaces, the arrangement being such that as the cam follower passes from one cam surface to another it disengages said one abutment to permit an indexing movement of the main element under the bias thereof which is arrested when the cam follower engages an abutment next adjacent said one abutment.

The device may comprise a base and a relatively rotatable cover, one of which has a circumferential array of compartments and the other of which has an aperture which is alignable with a selected one of said compartments when the base unit and cover are relatively rotated, said main element being operatively connected to one of the base unit and cover to rotate therewith and said means biasing the main element being a torsion spring which is tensionable between the base and cover, the disposition of said abutments being such that at successive indexing movements of the main element the aperture is aligned with a different one of said compartments. In this arrangement the base may be in the form of a circular dish divided radially into compartments generally of sector shape and the cover may be circular and have in the region of its periphery an aperture corresponding in shape to each of the compartments.

The cam surfaces may be provided on respective timer members which are adjustably positionable relative to the control element to alter the time periods between successive actuations of the cam follower by the cam surfaces. The timer members may be levers which are angularly moveable relative to the control element about said axis thereof, means being provided to retain each timer member in a selected angular orientation relative to the control element.

The means for driving the control element in constant rotation may comprise a quartz chronometer, which may be powered by a dry battery.

The abutment surfaces preferably lie generally in respective planes containing the said rotational axis of the main element but the cam surfaces are preferably oblique with respect to planes containing the rotational axis of the control element so as to present cam surfaces inclined in the direction of relative movement of the cam follower.

The control element is preferably driven via a drive train which includes a driven gear which normally rotates with the control element but relative to which the control element is manually angularly adjustable.

The main and control elements may have a common axis of rotation and guide means may be provided to prevent rotation of the cam follower about said common axis, said maintaining means biasing the cam follower to tend to move radially inwardly of said axis. In this arrangement said guide means may be a slot in a non-rotatable housing disposed radially with respect to said common axis and said maintaining means may be a spring in tension or compression between the housing and the cam follower.

Alternatively the main and control elements may rotate about spaced apart, parallel axes and the cam follower may be a rocker lever rotatable about a third axis parallel with the rotational axes of the main and control elements, said maintaining means comprising spring means biasing the rocker lever to rotate about its axis so that projections at opposite ends of the rocker lever remain in contact respectively with the abutments and cam surfaces.

BRIEF DESCRIPTION OF THE DRAWINGS

Embodiment of the invention will now be described by way of non-limitative example with reference to the accompanying drawings, in which:

FIG. 4A illustrates an underplan view of a time set lever, FIGS. 4B-4E illustrate a side elevation of the four time set levers included in the timer mechanism.

DETAILED DESCRIPTION OF THE INVENTION

Figure 1:
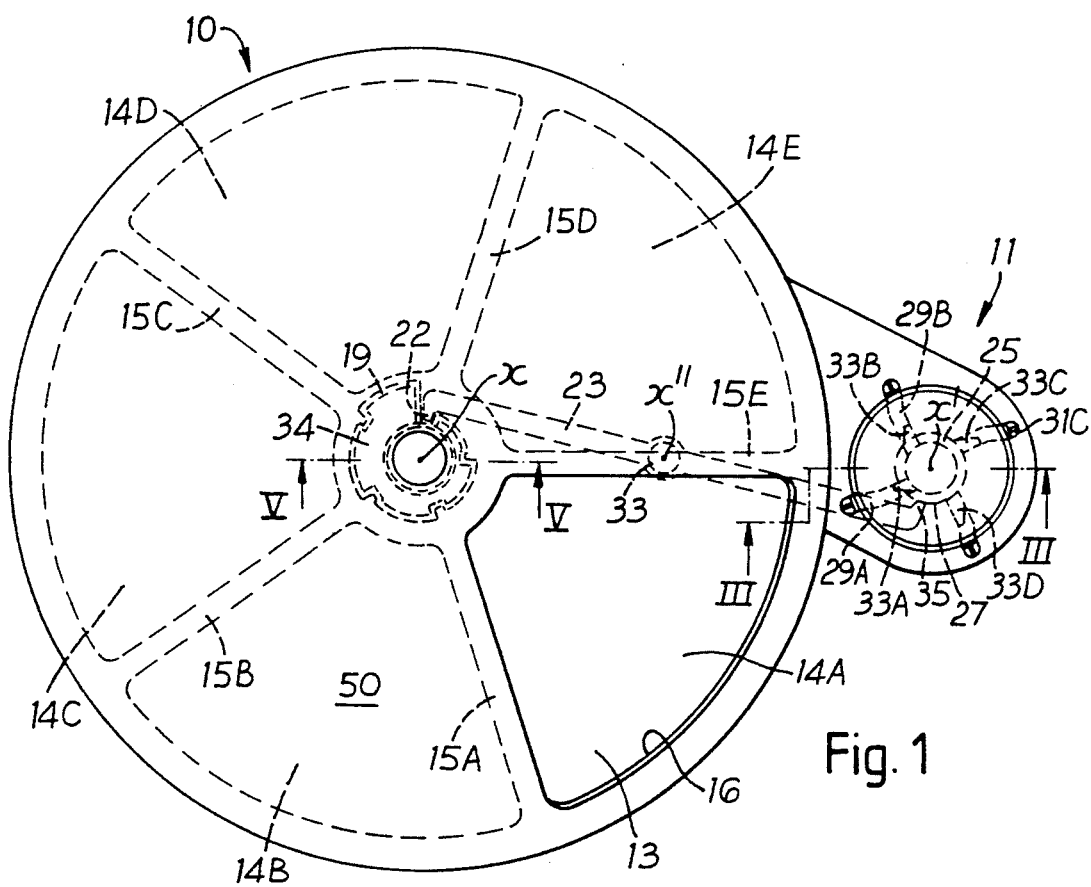
FIG. 1 is a plan view of a first embodiment of a dispensing device in accordance with the invention.
Figure 2:
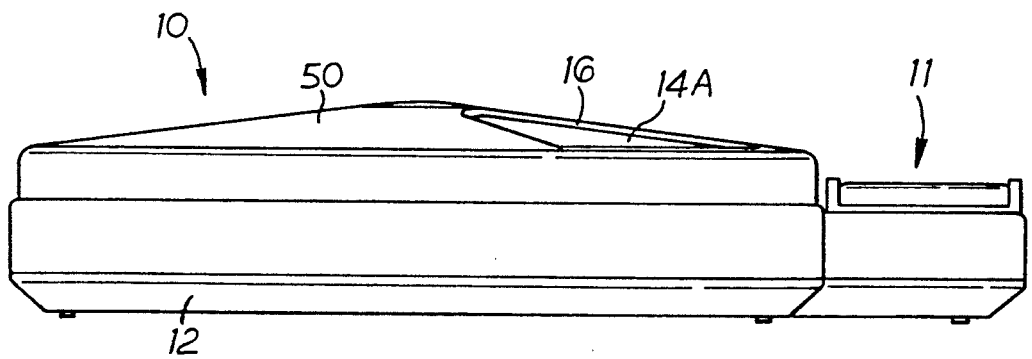
FIG. 2 is a side elevation of the device of FIG. 1.
Figure 5:
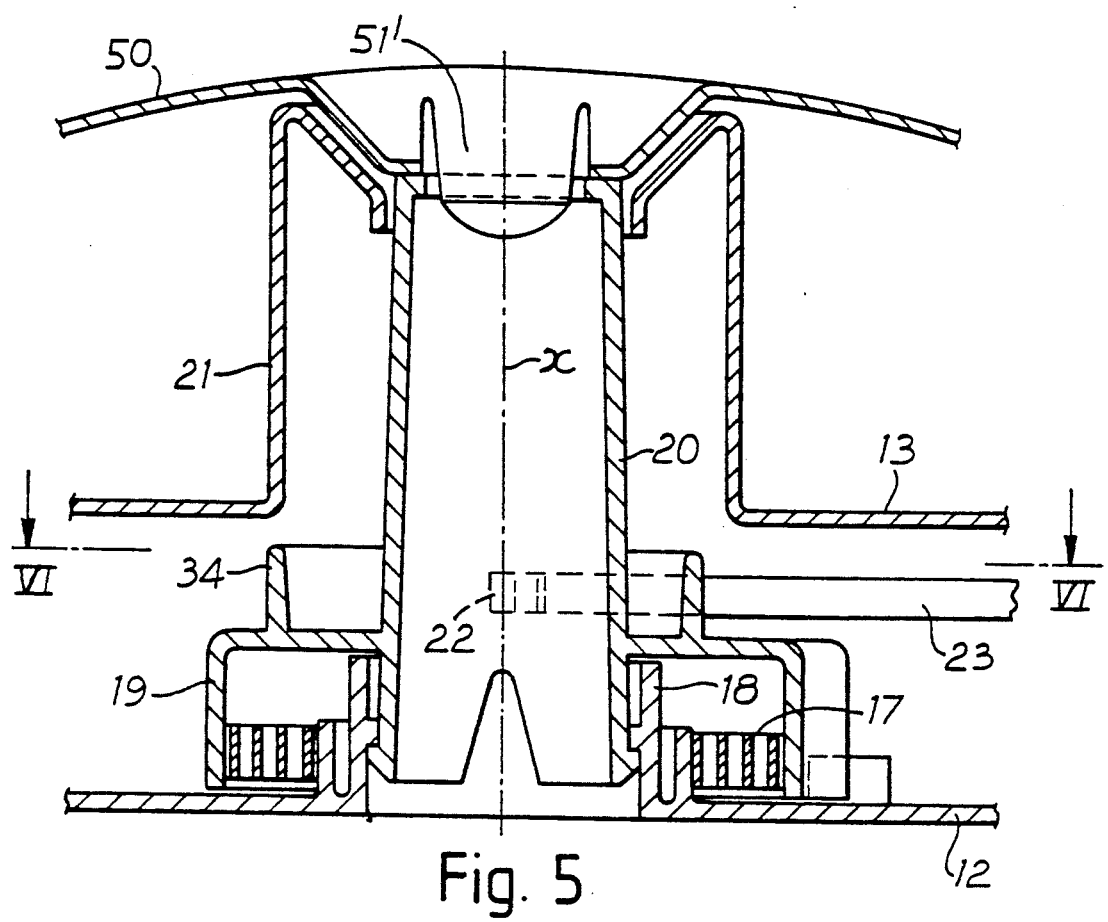
FIG. 5 is a sectional elevation on an enlarged scale taken on the line V—V of FIG. 1.

The dispensing device illustrated comprises a stationary casing 12 adapted to stand on a flat surface such as the floor (FIG. 2). The base 12 has rotor 10 and timer 11 areas. Within the rotor area 10 is a stationary dish-shaped part 13 above which a cover 50 of inverted dish shape is rotatable relative to the casing 12 about a vertical axis x. The interior of the dish 13 is divided into five equal sectors 14A, B, C, D and E by five equi-angularly spaced radial ribs 15A, B, C, D and E. The rotary cover 50 is formed with a sector-shaped opening 16 of the same dimensions as each of the sectors 14 of the dish 13. By aligning the opening 16 successively with the sectors 14A-E of the dish 13 comestibles previously placed in the sectors of the dish 13 successively become accessible e.g. to a cat or dog through the opening 16 of the cover 50. The cover 50 is driven to rotate about axis x in the anti-clockwise direction as viewed in FIG. 1 by a clock spring 17 (FIG. 5) in tension between a hub 18 of casing 12 (FIG. 5) centrally disposed in the rotor area 10 thereof and a formation 19 at the base of and integral with an upstanding main element or spindle 20. This direction of rotation is indicated by arrow "A" in FIG. 6. The spindle 20 is rotatable relative to the hub 18 and from its upper end project a pair of resilient tabs, one of which is visible at 51. These resiliently engage a central aperture of cover 50 so that the latter is normally frictionally engaged to the spindle 20. When it is desired to remove or to alter the angular position of the cover 50, however, the tabs 51 can be squeezed together to release the cover 50 from the spindle. A central formation 21 upstanding from the bottom of the dish 13 provides a bearing for the upper region of the spindle 20.

Rotation of spindle 20, and thus cover 50, when spring 17 is loaded is resisted by a hook-shaped projection 22 (FIG. 6) at one end of a rocker lever 23 when the pawl 22 engages in one of a series of notches 24A, B, C, D and E in an upper central part 34 of the formation 19. The notches 24A-E define respective abutments 24F-J on their sides counter to the direction of rotation "A", these abutments lying in respective planes containing the axis "x" and serving to engage and arrest the projection 22 to prevent rotation of the spindle 20 by spring 17. The notches 24A-E are equi-angularly spaced about the centre of formation 19 and they correspond in number to the sectors 14. The arrangement is such that when pawl 22 is in one of the notches 24 the opening 16 of cover 50 will be aligned with a respective one of the sectors 14 of dish 13.

Figure 3:
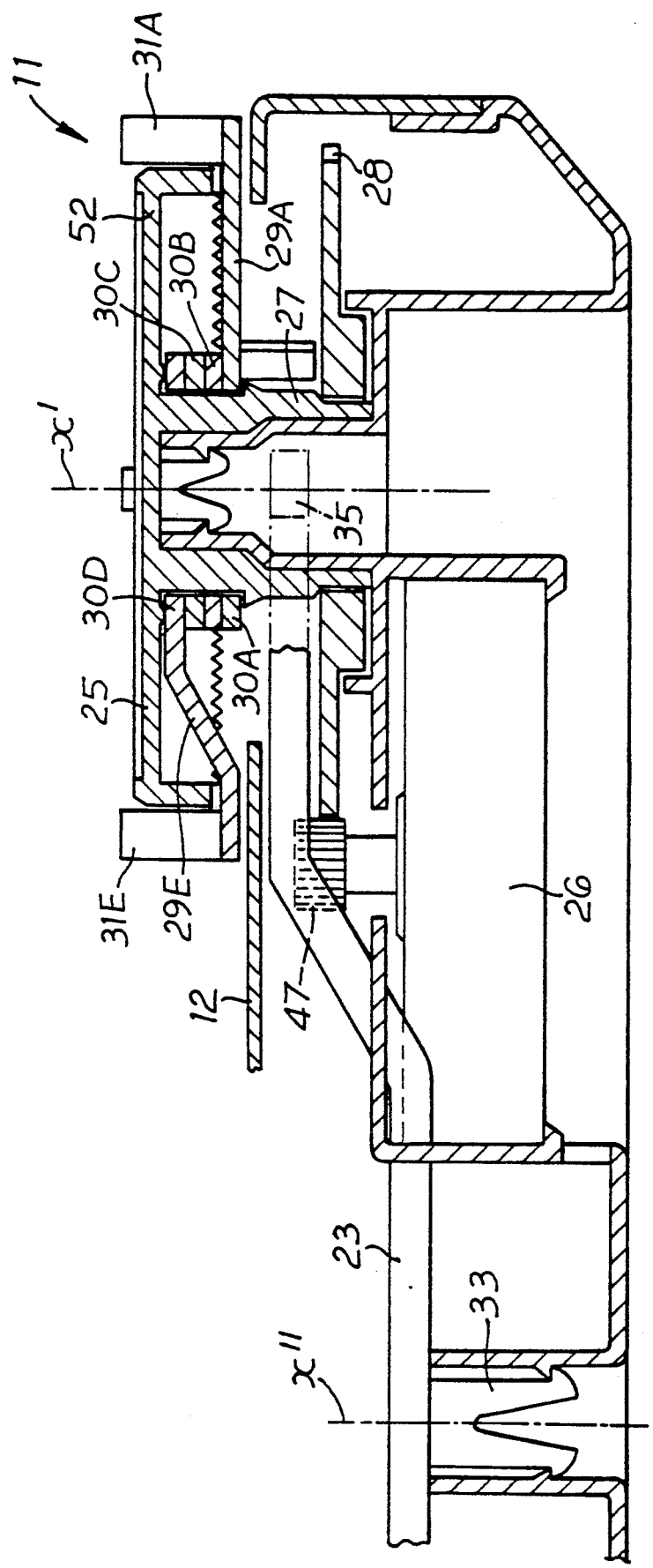
FIG. 3 is a sectional elevation taken on the line III—III of FIG. 1.

The opposite end of the rocker lever 23 is controlled by a timer mechanism 25 in the timer area 11 of the casing 12 and the timer mechanism 25 is driven in rotation about a vertical axis x' by an electric motor 26 (FIG. 3) via meshing gears 47 and 28. The timer mechanism 25 comprises a plate 52, or control element, at the upper end of a hub 27 driven by gear 28. Beneath plate 52 are four time set levers 29A, B, C, and D shown individually in FIG. 4. The time set lever 29A is shown in underplan view in FIG. 4A and in side elevation in FIG. 4B. The remaining time set levers 29B-D are shown in side elevation in FIGS. 4C-E respectively.

Each time set lever 29A-D has at one end a ring 30A-D which surrounds hub 27 and at its other end an upstanding manipulator arm 31A-D. In the assembled condition the rings 30A-D are stacked on top of one another around the hub 27 and the arms 31A-D project upward alongside the periphery of plate 52. To allow this the levers, starting from the flat lever 29A, become progressively more cranked in the vertical plane as shown in FIG. 4.

Projecting from the underside of each time set lever 29A-D is a respective lug 32A-D which presents a cam surface clockwise of the associated ring 30A-D as viewed from above (see FIG. 1). The time set levers 29A-D are individually rotatable about hub 27 (within the limits of the adjacent pair of time set levers) and in a manner known per se each time set lever is in "click stop" frictional engagement with the underside of plate 52 so that it will tend to remain in the angular position relative to plate 52 to which it is moved by manipulation of the associated arm 31A-D.

The rocker arm 23 is pivoted intermediate its ends at 33 relative to casing 12 so as to be rotatable about a vertical axis x" intermediate and parallel with axes x and x'. The rocker arm is biassed by a spring (not shown) to rotate anti-clockwise as viewed in FIG. 1 so that hook 22 tends to remain in contact with the central part 34 of the rotor assembly in which the notches 24A-E are formed. At its opposite end the rocker arm 23 is formed with a second, oppositely-directed hook or projection 35 and similarly this tends to remain in contact with hub 27 of the control element. So positioned hook 35 is in the path of the cams 33A-D as the time set levers are rotated jointly with hub 27 and plate 52 anti-clockwise as viewed in FIG. 1 by motor 26. As a cam surface 32A-D engages the hook 35 it rotates the rocker lever 23 clockwise as viewed in FIG. 1, disengaging the hook 22 from the abutment 24F-J which it currently engages.

Figure 6:
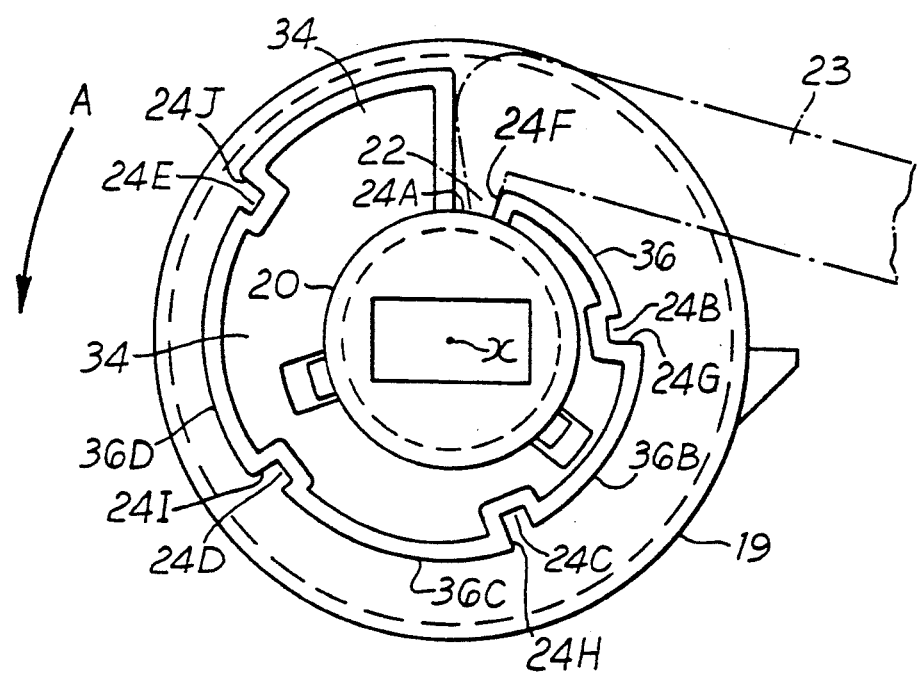
FIG. 6 is a view taken on the line VI—VI of FIG. 5.

Each of the abutment surfaces 24F-J of the notches 24A-E in the central formation 34 of the rotor assembly is located successively further from the axis x from one abutment to the next in the clockwise direction as viewed in FIGS. 1 and 6 so that each abutment 24G-J extends further from axis x than the abutment on its anti-clockwise side. The effect of this arrangement is that if the rocker lever 23 is pivoted against its spring bias just sufficiently for the hook 22 to clear the abutment 24F the cover 50 will be permitted to rotate under the influence of spring 17 until the hook 22 catches the abutment 24G, arresting the cover 50. If thereafter the rocker arm is rotated just sufficiently for the hook 22 to clear the abutment 24G the cover 50 will rotate until hook 22 catches the abutment 24H, and so on for abutments 24I and 24J. The rocker lever 23 is at a maximum displacement in the clockwise direction when hook 22 engages the abutment 24J. Thereafter the cover 50 and main element or spindle 20 must be rotated anti-clockwise manually back to the starting position illustrated, and this will automatically retension spring 17 ready for the cycle to be recommenced.

These movements of the rocker lever 23 are controlled by the cam surfaces 32A-D of the time set levers 29A-D and it will be noted that these cam surfaces or lugs are positioned successively further from the axis x' in increments of one time set lever to the next of the same ratio as those of the abutments 24F-J. Unless the axis x" is exactly equidistant between axes x and x' the radial distance from axis x' to the radially outer side of a lug 32A-D will not be the same as the distance from axis x to the radially outer extremity of the abutment 24F-J but the proportions will be the same to achieve the desired movements of the rocker lever 23. Between notch 24A and notch 24B the formation 34 has a sloping surface 36A of a little less amplitude than the clearance of cam surface 32A relative to axis x', between notches 24B and 24C there is a sloping surface 36B of a little less amplitude than the clearance of cam surface 32B, between notches 24C and 24D a sloping surface 36C of a little less amplitude than cam surface 32C and between notches 24D and 24E a sloping surface 36D of a little less amplitude than the cam surface 32D.

The motor 26 is preferably a quartz chronometer which will drive the pinion 47 very slowly and requires only a low power source such as a dry battery. This together with the gearing up of the drive train 47, 28 means that the timer mechanism 25 comprising control element or plate 52 and time set levers 29A–D may be rotated very slowly indeed—for example one full revolution every 72 hours. Within this time span exposure of the sectors 14B–E successively by the opening 16 can be controlled by moving the time set levers 29A–D relative to the plate 52. The time when each time set lever 29A–29D will cause rotation of the cover 50 to a new angular position will be determined by the angular position of the time set lever relative to plate 52.

To use the device illustrated to feed a domestic pet during the owner's absence an individual meal is placed in the appropriate number of successive sectors or compartments 14A–E of the dish 13. For this purpose the cover 50 is removed from spindle 20 by squeezing together the tabs 51. The top of the plate 52 will preferably have markings whereby current time can be determined and the timing represented by chosen positions relative to the plate of the time set levers 29A–D. The latter are angularly adjusted to trigger the rocker lever 23 at the desired time intervals. This adjustment facility has the advantage that movement of the cover 50 need not occur at equal time intervals. This is desirable in case the owner wishes to set the device to dispense two meals with an interval of, say, 9 hours to feed the animal morning and evening and then provide a longer interval—overnight—before the next, morning meal is dispensed.

When cam surface 32A of time set lever 29A strikes hook 35, the timer 25 rotating anti-clockwise as viewed in FIG. 1 under the influence of the motor 26, the hook 35 rides up cam surface 33A causing rocker lever 23 to swing about axis x" until hook 22 disengates abutment 24F. The main element or spindle 20 rotates anti-clockwise as viewed in FIG. 1 until hook 22 engages the abutment 24G on the anti-clockwise side of surface 36B. While the hook 22 travels over surface 36A and after it has entered notch 24B the hook 35 will be held away from hub 27 in a position where subsequently it will be struck by the cam surface 32B. This will cause displacement of hook 22 out of notch 24B to a position where it will engage the abutment 24H at the anti-clockwise end of surface 36C. In turn cam surface 32C will displace hook 22 out of notch 24C allowing the rotor 13 to rotate until hook 22 catches the abutment 24I at the anti-clockwise end of surface 36D. Finally cam surface 32D will displace hook 22 out of notch 24D allowing the spindle to rotate until hook 22 reaches its final position in notch 24E against abutment 24J. When the device is to be used again rocker lever 23 is manually rotated clockwise until hook 22 clears the notch 24E. The spindle 20 13 is then rotated anti-clockwise to the starting position shown, re-tensioning the spring 17. As at this time the hook 35 will have passed the cam surface 32D it is brought by the spring loading of the rocker lever 23 back into contact with the hub 27 ready for the cycle to be recommenced.

Figure 7:
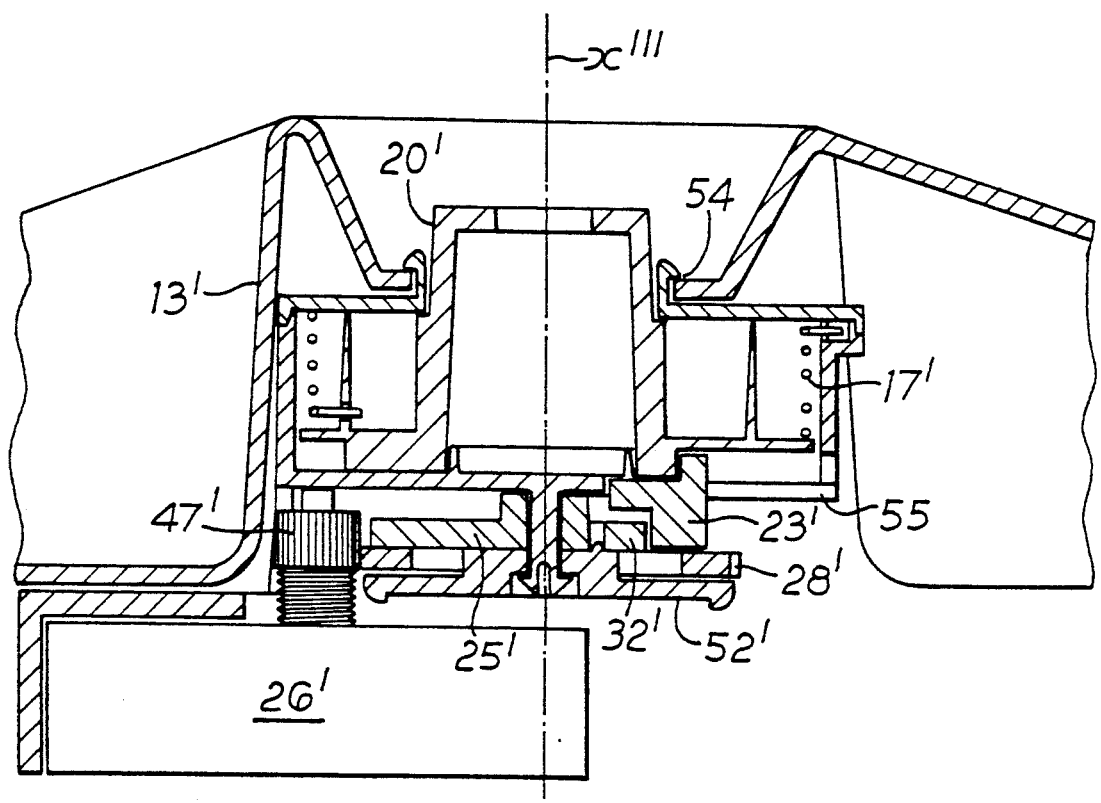
FIG. 7 is a sectional elevation of a second embodiment of a dispensing device in accordance with the invention.
Figure 8:
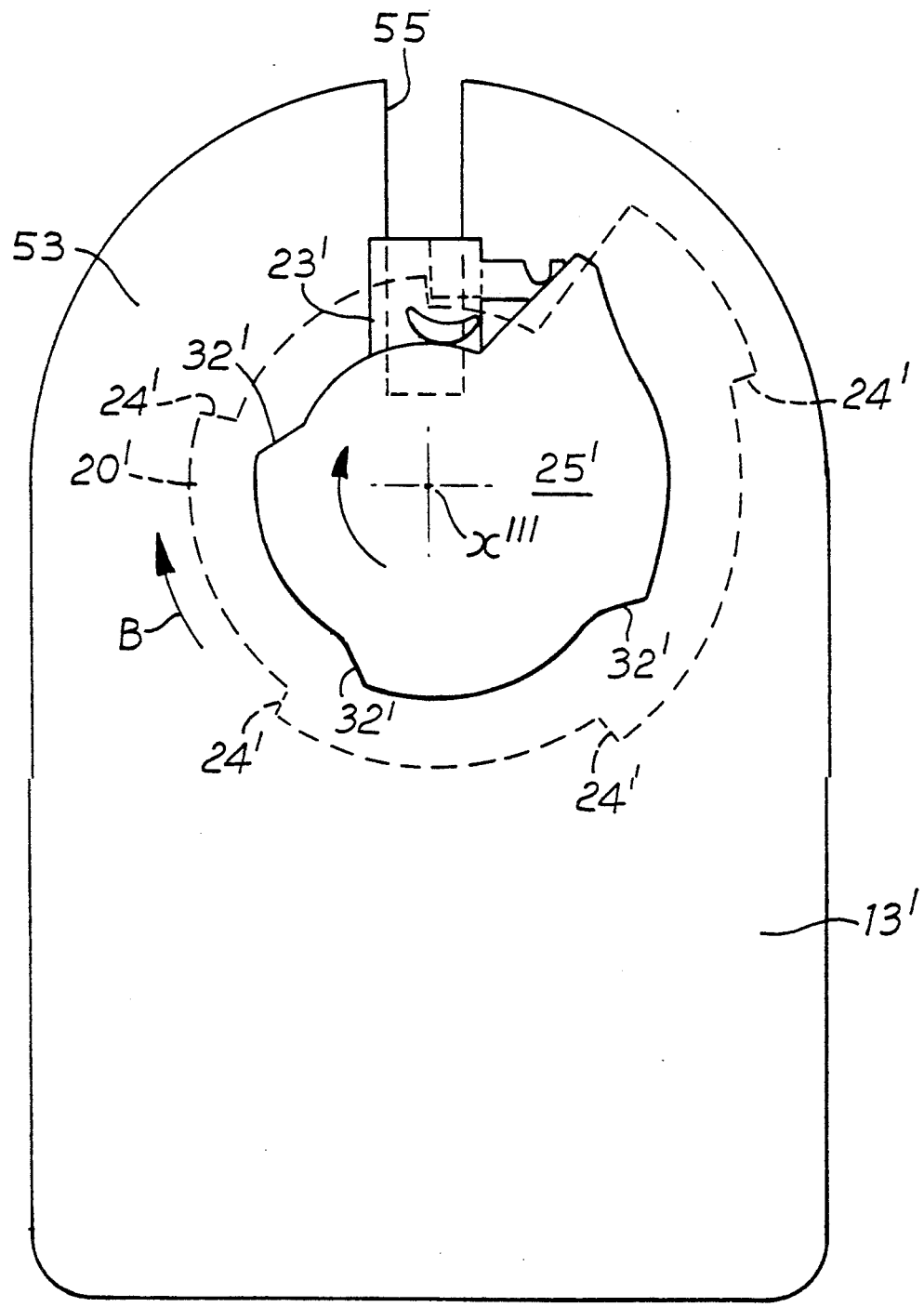
FIG. 8 is a view from below of the device of FIG. 8 with parts removed for clarity.

An alternative embodiment of the invention is illustrated in FIGS. 7 and 8, in which like parts have like reference numerals but with the suffix'. This embodiment differs primarily in that the main element or spindle 20' and the control element or timer 25' are superimposed and rotate about a common axis x" instead of about parallel, spaced apart axes. The function of the cammed levers 29 is here performed by a single cam element 32'. The rocker lever 23 is dispensed with and replaced by a cam follower 23' which instead of pivoting is moveable radially of the common axis x" with respect to cam 32' and spindle 20'.

As in the previous embodiment, the mechanism is housed in a casing 13' presenting upwardly an array of sector-shaped compartments (not shown) which surround the spindle 20'. At its upper end the spindle 20' is releasably engageable with a circular lid or cover (not shown) formed with an aperture which can be aligned with any one of the compartments as the lid rotates. In this embodiment the spindle 20' is biassed to rotate in the direction of arrow "B" in FIG. 8 by a clock spring 17' which acts between the spindle and a housing 53 which releasably snap-engages at 54 with the casing 13'. The underside of the housing 53 is formed with a radial slot 55 in which the cam follower 23' is captive.

The shape of the bottom of the spindle 20' can be appreciated from FIG. 8. It has a series of abutments 24' radial with respect to axis x" and similar in number and angular disposition to the cam surfaces 32' of the cam 23'. The cam follower 23' is biassed by a spring (not shown) to remain in contact both with the cam follower 23' and the spindle 20'.

Timer 26', which is preferably a motor similar to the one employed in the first embodiment, continually drives pinion 47' which meshes with gear 28' and thus continuously drives cam 32' and a timer plate 52' on the opposite side of gear 28'. To provide for setting the times at which the device will be actuated the plate 52' and cam 32' engage the gear 28' by a one way ratchet (not shown) or a friction clutch arrangement (not shown) enabling them to be angularly adjusted manually relative to the gear 28'. The plate 52' preferably has markings similar to those of plate 52 to permit alignment with a marker arrow (not shown) on casing 13' when the assembly is inverted.

As in the previous embodiment, the lid or cover (not shown) is rotated by spindle 20' in a direction to wind up spring 17' until cam follower 23' engages a first abutment 24' of spindle 20' which is nearest to the axis x" of rotation. The cam follower 23' holds the spindle 20', and thus the lid, in this position until the cam surface 32' nearest to axis x" displaces the cam follower 23' radially outwardly sufficiently to disengage the first abutment 24'. The spring 17' is then able to rotate spindle 20' until the cam follower 23' is arrested by the abutment 24' next nearest the axis x", and as a result of this indexing movement of the spindle 20' the aperture in the lid is aligned with a first compartment of the casing 13'. Successive displacements of the cam follower 23' by the successive cam surfaces 24' cause successive indexing rotational movements of the spindle 20' at timed intervals corresponding to the circumferential separation of the cam surfaces 32' until the spindle 20' reaches a final position in which the cam follower 23' engages the abutment 24' furthest from the axis x".

Figure 9:
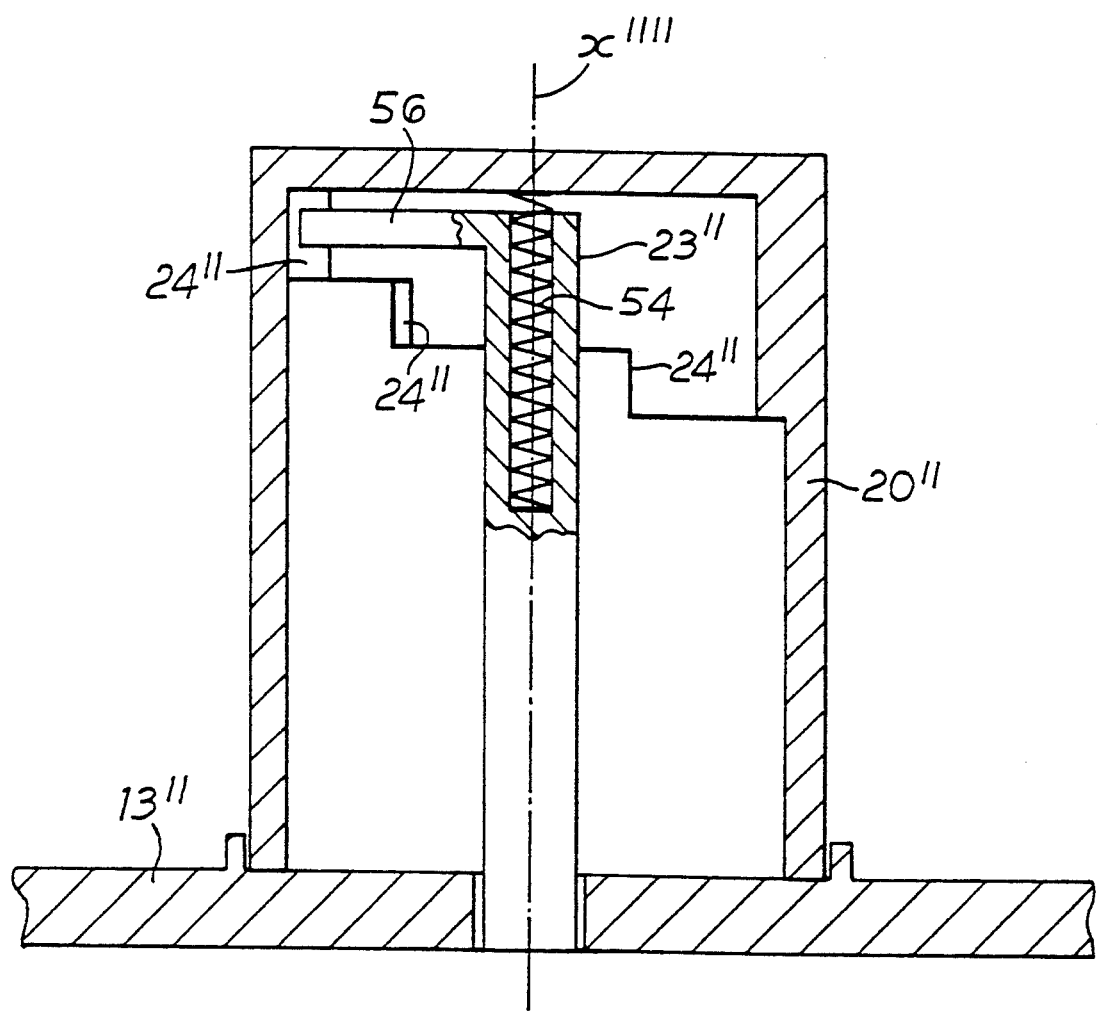
FIG. 9 is a sectional elevation of a third embodiment of a dispensing device in accordance with the invention

FIG. 9 illustrates illustrates in simplified form yet another embodiment of the invention which differs from the previous two primarily in that the array of abutments 24" of the spindle 20" is stepped circumferentially about the rotational axis x" in axial rather than radial increments. The cam follower 23" is permitted to move downwardly at intervals under the influence of spring 54 by a cam arrangement (not shown) at its bottom end. As it does so it disengages a first, highest abutment 24" permitting indexing rotation of the spindle 20" under the influence of a clock spring (not shown) until the stop 56 projecting radially from the top of the cam follower 23" engages a second abutment surface 24" which is further from the plane of the paper as viewed in FIG. 9 than the first abutment although it may be equally radially spaced from the axis x'''.

Incremental lowering of the cam follower member 23" by a cam arrangement (not shown) at its lower end can be either by means of a cam similar in shape to the cam 23' of the second embodiment rotating about an axis perpendicular to the axis x''' so that the bottom of the cam follower 23" rests on and follows its periphery or by means of a cam (not shown) rotating about an axis parallel with the axis x''' and presenting to the bottom of the cam follower a cam track stepped in the vertical direction.

It will be apparent that the number of sector-shaped compartments (14A-E in FIGS. 1-6) into which the cover 50 driven by a spindle 20 is divided and the number of time set levers 29A-D or cam surfaces 32 used to align them successively with the aperture 16 of the lid or cover is capable of wide variation according to the intended uses of the device. Exposure of the compartments successively by an opening in a rotating cover is not essential. In a further modification of the invention the equivalent of dish 13 is a rotor and the equivalent of aperture 16 in cover 50 is an opening in a stationary part of the casing. The rotating sectors may align successively with a lateral or a downward opening of the casing. In the latter case the device may be in an elevated position so that as a compartment aligns with the downward opening comestibles fall from the device. In the case of a device for feeding fish located over an aquarium or pond food may fall directly into the water. An elevated device in accordance with the invention for feeding e.g. cattle or domestic animals may drop food into a separate container—e.g. a feeding dish—positioned beneath it.

I claim:

1. A dispensing device comprising a main element, means biassing the main element to tend to rotate in one sense about an axis of the main element, a control element, means for driving the control element in constant rotation about an axis of the control element, a series of abutments of the main element in an array stepped circumferentially about said axis thereof, a series of cam surfaces of the control element in an array stepped circumferentially about said axis thereof, a cam follower and means for maintaining one end of the cam follower in contact with one of said series of abutments and its other end in contact with said series of cam surfaces such that as the cam follower passes relatively from one cam surface to another it disengages said one abutment to permit an indexing movement of the main element under the bias thereof which is arrested when the cam follower engages an abutment next adjacent said one abutment.

2. A device as claimed in claim 1 and comprising a base unit and a relatively rotatable cover, one of which has a circumferential array of compartments and the other of which has an aperture which is alignable with a selected one of said compartments when the base unit and cover are relatively rotated, said main element being operatively connected to one of the base unit and cover to rotate therewith and said means biassing the main element being a spring which acts between the base unit and cover, said abutments being disposed such that at successive indexing movements of the main element the aperture is aligned with a different one of said compartments.

3. A device as claimed in claim 2, wherein the base unit is in the form of a circular dish divided radially into compartments generally of sector shape and wherein the cover is circular and has in the region of its periphery an aperture corresponding in shape to each of the compartments.

4. A device as claimed in claim 1, wherein said cam surfaces are provided on respective timer members which are adjustably positionable relative to the control element to alter the time periods between successive actuations of the cam follower by the cam surfaces.

5. A device as claimed in claim 4, wherein the timer members are levers which are angularly moveable relative to the control element about said axis thereof, means being provided to retain each timer member in a selected angular orientation relative to the control element.

6. A device as claimed in claim 1, wherein said means for driving the control element in constant rotation comprises a quartz chronometer.

7. A device as claimed in claim 6, wherein said chronometer is powered by a dry battery.

8. A device as claimed in claim 1, wherein the abutments lie generally in respective planes containing the said rotational axis of the main element but the cam surfaces are oblique with respect to planes containing the rotational axis of the control element so as to present cam surfaces inclined in the direction of relative movement of the cam follower.

9. A device as claimed in claim 1, wherein the control element is driven via a drive train which includes a driven gear which normally rotates with the control element but relative to which the control element is manually angularly adjustable.

10. A device as claimed in claim 1, wherein the main and control elements have a common axis of rotation and wherein guide means is provided to prevent rotation of the cam follower about said common axis, said maintaining means biassing the cam follower to tend to move radially inwardly of said axis.

11. A device as claimed in claim 10 wherein said guide means is a slot in a non-rotatable housing disposed radially with respect to said common axis and wherein said means for maintaining is a spring in tension or compression between the housing and the cam follower.

12. A device as claimed in claim 1, wherein the main and control elements rotate about spaced apart, parallel axes and wherein the cam follower is a rocker lever rotatable about a third axis parallel with the rotational axes of the main and control elements, said maintaining means comprising spring means biassing the rocker lever to rotate about its axis so that projections at opposite ends of the rocker lever remain in contact respectively with the abutments and cam surfaces.

* * * * *